United States Patent
Kameyama (10) Patent No.: US 6,998,810 B2
(45) Date of Patent: Feb. 14, 2006

(54) POSITION CONTROLLER OF FEED SHAFT

(75) Inventor: Tomohisa Kameyama, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 10/934,203

(22) Filed: Sep. 3, 2004

(65) Prior Publication Data

US 2005/0052149 A1 Mar. 10, 2005

(30) Foreign Application Priority Data

Sep. 10, 2003 (JP) ............................. 2003-317945

(51) Int. Cl.
*G05B 11/36* (2006.01)

(52) U.S. Cl. ..................... 318/609; 318/601; 318/615; 318/632; 318/638; 318/461

(58) Field of Classification Search ................ 318/609, 318/610, 615, 601, 602, 638, 461, 632
See application file for complete search history.

(56) References Cited

U.S. PATENT DOCUMENTS

| | | | | |
|---|---|---|---|---|
| 4,827,200 A | * | 5/1989 | Ogura et al. ................. 318/561 |
| 4,868,474 A | * | 9/1989 | Lancraft et al. .......... 318/568.2 |
| 5,410,234 A | * | 4/1995 | Shibata et al. .............. 318/700 |
| 6,184,644 B1 | * | 2/2001 | Eguchi ........................ 318/632 |
| 6,313,591 B1 | * | 11/2001 | Welker et al. ................. 318/34 |
| 6,470,225 B1 | * | 10/2002 | Yutkowitz .................... 700/44 |

FOREIGN PATENT DOCUMENTS

| | | |
|---|---|---|
| JP | 3110607 | 5/1991 |
| JP | 3032550 | 2/1997 |
| JP | 200347743 | 12/2000 |
| JP | 2001309676 | 11/2001 |

\* cited by examiner

*Primary Examiner*—David Martin
*Assistant Examiner*—Erick Glass
(74) *Attorney, Agent, or Firm*—Gauthier & Connors LLP (57) ABSTRACT

A position controller for controlling a position of a feed shaft of a machine having a motor and the feed shaft driven by the motor is provided. A subtractor calculates a difference between a speed instruction and a speed detection value of a motor and outputs as a speed difference. An adder 20 adds the speed difference and a speed instruction compensation value and a speed difference proportion calculator calculates a proportional component of the speed difference based on the added result and a proportional gain. A speed difference integral calculator calculates an integral component of the speed difference based on the speed difference and an integral gain. An adder 6 adds the proportional component of the speed difference and the integral component of the speed difference to output a torque instruction.

5 Claims, 8 Drawing Sheets

Prior Art

Fig. 10

Prior Art

Fig. 11

Prior Art

POSITION CONTROLLER OF FEED SHAFT

CROSS-REFERENCE TO RELATED APPLICATION

The priority Japanese Patent Application Number 2003-317945 upon which this patent application is based is hereby incorporated by reference.

BACKGROUND OF THE INVENTION

1. Field of the Invention

The present invention relates to a position controller of a feed shaft (table) in a machine tool or the like.

2. Description of the Related Art

For full-close control systems in which a linear scale is attached to a movable portion of a machine tool, numerous attempts have been made to reduce positioning error during a transient response. It is possible to reduce positional error during transient response by setting high gains for a speed loop and a position loop. With such a setting, it is possible to very precisely control a table in response to an unexpected load changing disturbances, such as a change in a sliding resistance of the movable portion or in a cutting load.

Figure 8:
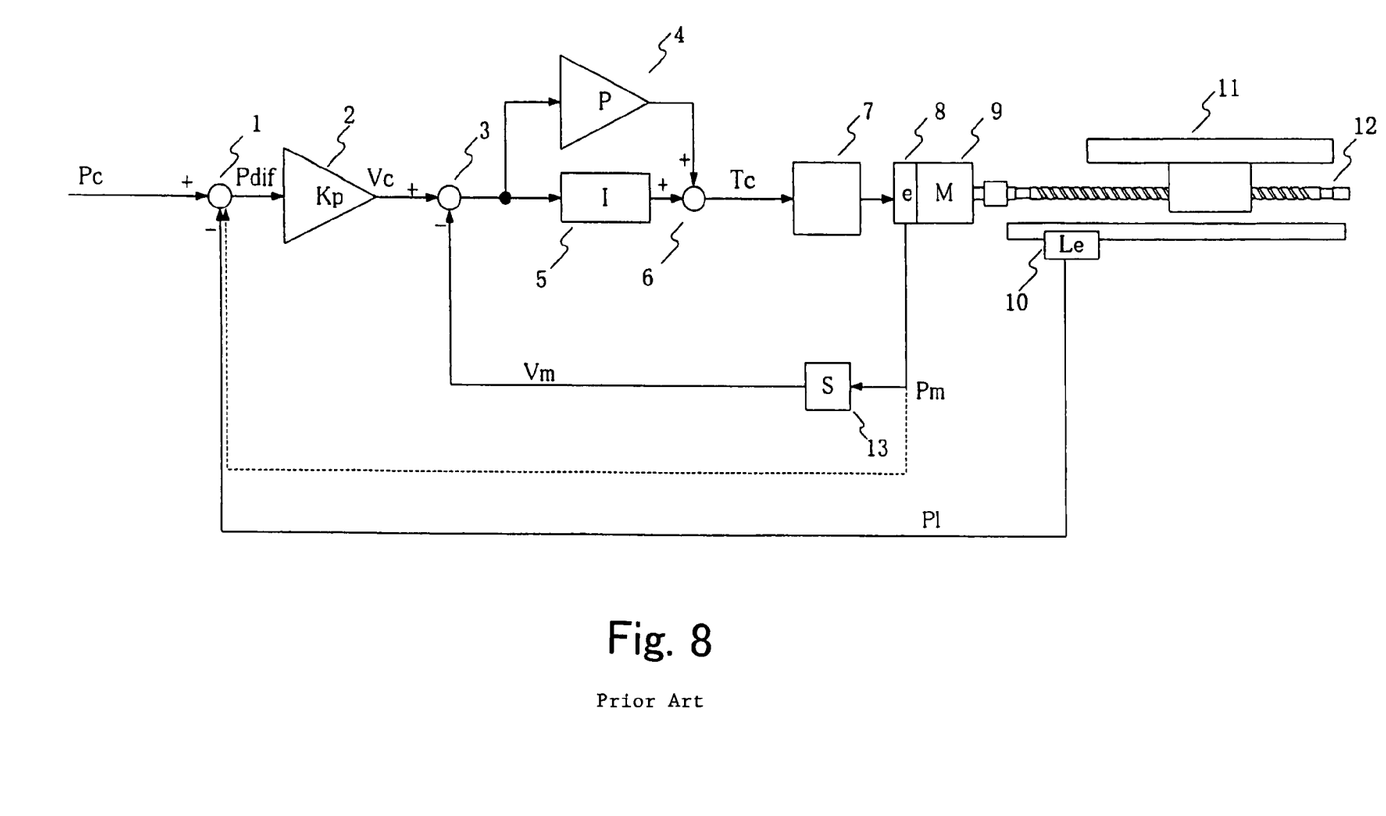
FIG. 8 is a block diagram showing a related art.

FIG. 8 is a block diagram showing a typical full-close control. A difference between a position detection value Pl of a table 11 detected by a linear scale 10 and used as a position feedback value and a position instruction Pc is calculated. A speed instruction calculator unit 2 multiplies the difference by a proportional gain Kp and outputs a speed instruction Vc. A differentiator 13 differentiates a position detection value Pm of a position detector 8 mounted on a motor 9 and outputs a speed detection value Vm of the motor. A subtractor 3 calculates a difference between the speed instruction Vc and the speed detection value Vm of the motor and outputs the difference as a speed difference. Based on the speed difference, a speed loop proportional gain Pv, and a speed loop integration gain Iv, a speed difference proportion calculator 4 and a speed difference integration calculator 5 respectively output a proportional component of the speed difference and an integral component of the speed difference. An adder 6 adds the proportional component of the speed difference and the integral component of the speed difference and outputs a torque instruction Tc. Reference numeral 7 in FIG. 8 indicates various filter units for filtering the torque instruction and current controller units. In typical semi-close control, a motor position detection value Pm is used as a position feedback value in place of the position detection value Pl of the table detected by a linear scale 10.

With the development of various filtering techniques and vibration suppression controls and an increase in the speed of the speed loop achieved in recent years, it is now possible to set a high speed loop gain in the speed loop. However, in a full-close control in, for example, a large-scale machine tool with relatively low rigidity, lost motion due to, for example, backlash and flexure in a feed shaft mechanism such as a ball screw coupled to the motor prohibit the setting of a high position loop gain. As such, problems exist such as that the position cannot be highly precisely controlled during a transient response. Related art techniques directed to these problems will next be described.

Figure 6:
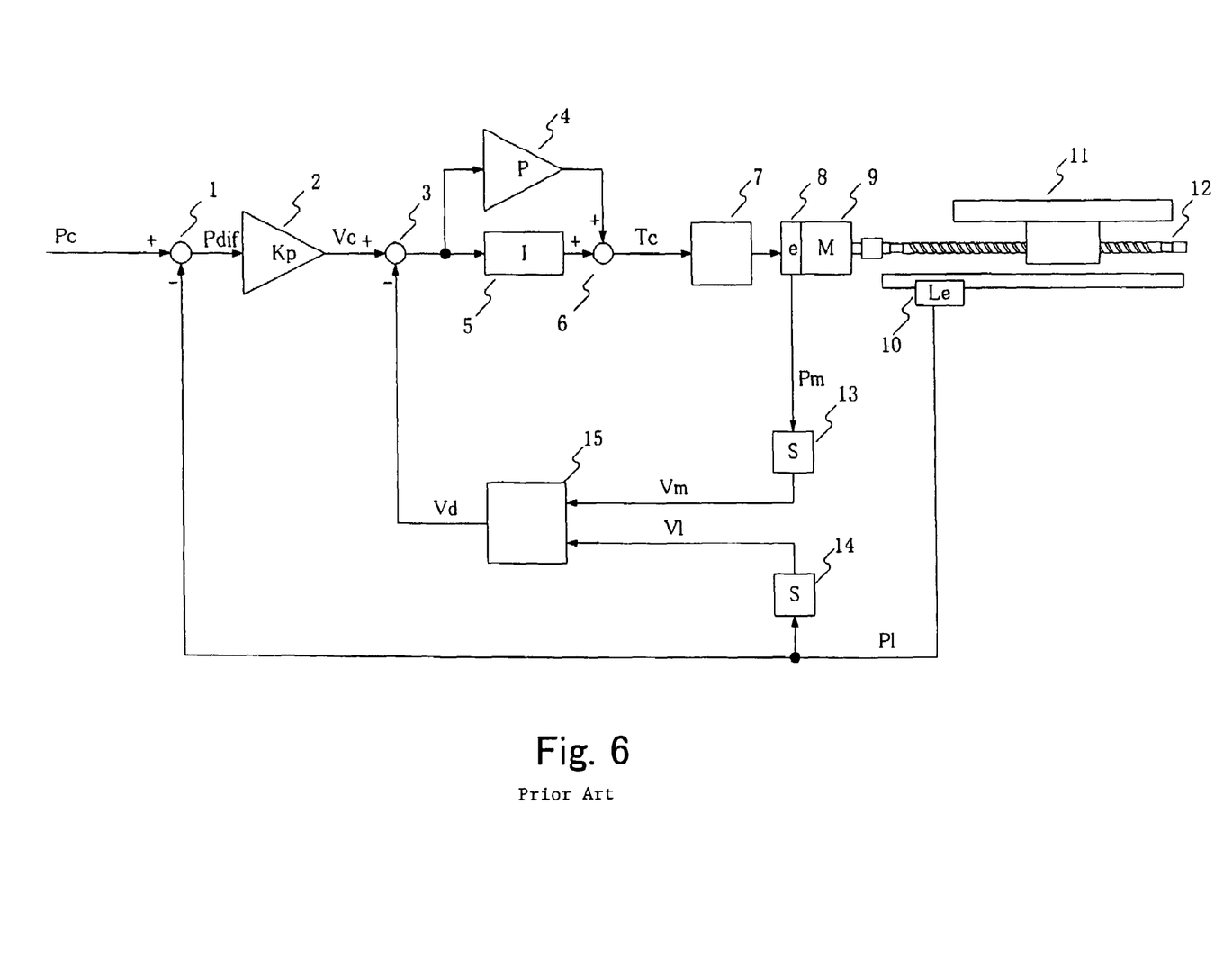
FIG. 6 is a block diagram showing a related art.

Japanese Patent Laid-Open Publication No. Hei 3-32550 (hereinafter simply referred to as "the '550 publication") discloses a technique in which a composite speed of a speed of a motor and a speed of a table is calculated and a speed control is applied using the composite speed as a speed detection value. FIG. 6 is a control block diagram showing a control in the '550 publication. A positional difference calculator unit 1 of FIG. 6 calculates a difference between a position instruction Pc and a position detection value Pl of a table detected by a linear scale 10. A speed instruction calculator unit 2 multiplies the difference by a proportional gain Kp and outputs a speed instruction Vc. A differentiator 13 calculates a speed detection value Vm of a motor from a position detection value Pm of the motor detected by a position detector 8 mounted on the motor 9. A differentiator 14 calculates a speed detection value Vl of a table 11 from a position detection value Pl detected by the linear scale 10. A speed calculator unit 15 outputs a speed represented by the following equation (1) as a speed feedback value Vd.

$$Vd = Vm + (Vl - Vm) \cdot (1/(1+TS)) \quad \text{(Equation 1)}$$

In equation (1), T represents a time constant and S represents differentiation. In addition, $(1/(1+TS))$ in equation (1) represents a first order delay circuit.

A speed difference calculator unit 3 calculates a speed difference between a speed feedback value Vd represented by equation (1) and the speed instruction Vc. A speed difference proportion calculator unit 4 calculates a proportional component of the speed difference using a proportional gain Pv on the speed difference. A speed difference integration calculator unit 5 calculates an integral component of the speed difference using an integration gain Iv on the speed difference. An adder 6 adds the outputs of the speed difference proportion calculator unit 4 and the speed difference integration calculator unit 5 to calculate a torque instruction Tc. In the structure shown in FIG. 6, the torque instruction Tc can be represented by the following equation (2).

$$Tc = [Kp \cdot (Pc - Pl) - Vm - (Vl - Vm) \cdot (1/(1+TS))] \cdot (Pv + Iv/S) \quad \text{(Equation (2))}$$

In the related art of the '550 publication shown in FIG. 6, when a small value is set for the time constant, the positional difference Pdif during transient response is reduced. However, because a vibration component during normal operation is increased, the position loop gain Kp cannot be set at a high value. When a large value is set for the time constant T, on the other hand, although the normal operation is stabilized, the positional difference Pdif during transient response is increased.

Figure 9:
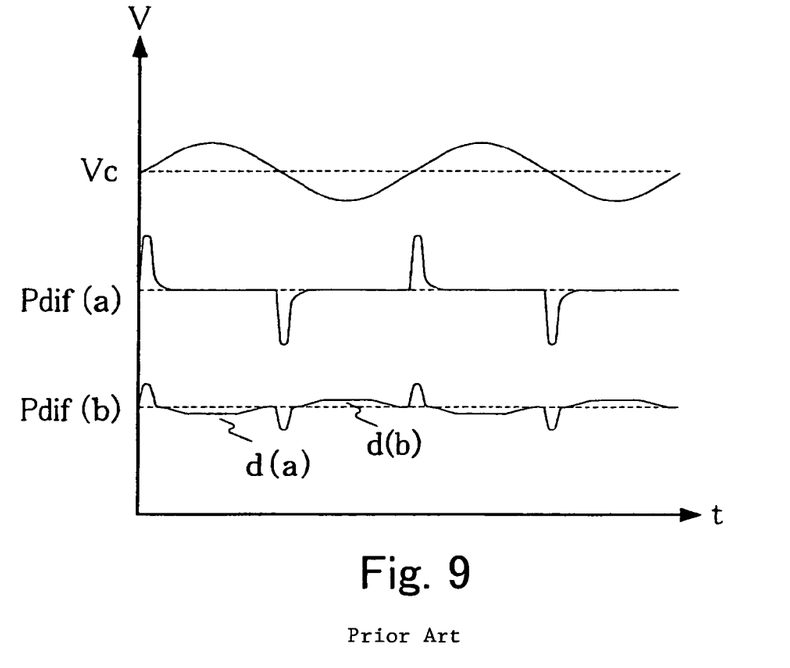
FIG. 9 is a diagram showing a positional difference waveform in the related art.

Problems which occur in a circular movement with a diameter of approximately 100 μm and a feed rate of 5 m/min. will now be described. FIG. 9 shows a speed instruction Vc and a positional difference Pdif in a circular movement. In a typical position control shown in FIG. 8, when the position loop gain Kp, the speed loop proportion gain Pv, and the speed loop integral gain Iv are set at sufficiently large values, the positional difference Pdif becomes a large positional difference only when the speed instruction is inverted as shown in Pdif(a) of FIG. 9. The positional difference Pdif when suitable time constants and gains are set corresponding to the characteristics of the device in the related art of FIG. 6 is shown in Pdif(b) of FIG. 9. As can be seen, the positional difference Pdif(b) when the speed instruction Vc is inverted is smaller than the positional difference Pdif(a) in FIG. 8. However, stationary differences d(a) and d(b) occurred which did not occur in FIG. 8.

Figure 7:
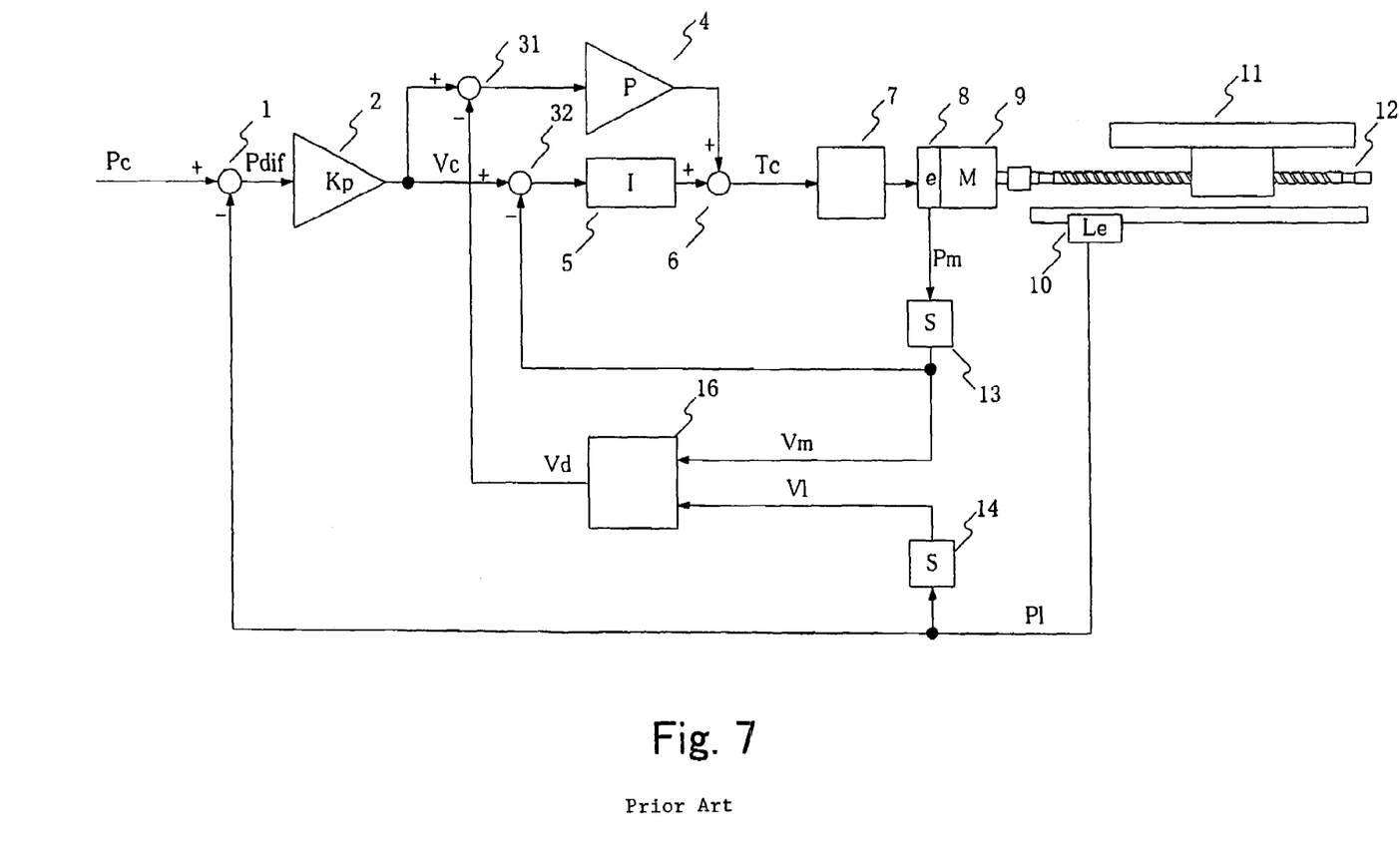
FIG. 7 is a block diagram showing a related art.

Japanese Patent Laid-Open Publication No. Hei 3-110607 (hereinafter simply referred to as "the '607" publication) discloses a technique for correcting a torque instruction according to a value proportional to a difference between a speed of a motor and a speed of a table. FIG. 7 is a control block diagram showing the related art of the '607 publication. Elements identical to those in FIG. 6 are assigned the same reference numerals and will not be described again. A speed calculator unit 16 of FIG. 7 calculates and outputs a speed feedback value Vd represented by the following equation (3).

$$Vd = k \cdot Vl + (1-k) \cdot Vm (0 \leq k \leq 1) \quad \text{(Equation (3))}$$

A subtractor 31 calculates a speed difference between the speed instruction Vc and the speed feedback value Vd represented by equation (3) and a speed difference proportion calculator unit 4 outputs a proportional component of the speed difference using a proportional gain Pv on the speed difference. A subtractor 32 calculates a speed difference between the speed instruction Vc and a speed detection value Vm of the motor (=SPm) and a speed difference integration calculator unit 5 outputs an integral component of the speed difference using an integral gain Iv on the speed difference. An adder 6 adds the proportional component of the speed difference and the integral component of the speed difference to calculate a torque instruction Tc. In FIG. 7, the torque instruction Tc can be represented by the following equation (4).

$$\begin{aligned} Tc &= [Kp \cdot (Pc - Pl) - \{k \cdot sPl + (1-k) \cdot sPm\}] \cdot \\ & \quad Pv + [Kp \cdot (Pc - Pl) - sPm] \cdot Iv/S \\ &= [Kp \cdot (Pc - Pl) - \{k \cdot Vl + (1-k) \cdot Vm\}] \\ & \quad Pv + [Kp \cdot (Pc - Pl) - Vm] \cdot Iv/S \end{aligned} \quad \text{(Equation (4))}$$

In FIG. 7, the integration process is performed based on the speed difference, to thus solve the problem of stationary difference occurring in the related art of FIG. 6.

Other references that disclose related art include Japanese Patent Laid-Open Publication Nos. 2001-309676 and 2000-347743.

In the '607 publication, as shown in FIG. 7, when k=0, the speed feedback value becomes Vm which is a speed detection value of the motor. In such a situation, it is possible to apply, to the proportional gain Pv and integral gain Iv of the speed loop, gain settings similar to that in the semi-close control. Therefore, with the increase in speed of the speed loop in recent years, it is now possible to realize control in which the speed difference of the motor is nearly zero. However, when the control target is a machine having a large lost motion including a loose ball screw, if the position loop gain Kp is set at a high value, low frequency vibration results. Thus, a high position loop gain Kp cannot be set. When k=1 in FIG. 7, the speed feedback value is Vl which is a speed detection value of the table. In this case, if the speed loop gain is set to a value similar to that in the semi-close control, because a feedback control is applied using the speed of the table which is a control target of a second order inertia, a high frequency vibration occurs. Thus, the speed loop gain cannot be set to a value similar to that in the semi-close control. In other words, when k is set at a large value, a high frequency vibration occurs in the speed loop, and, thus, the speed loop gain cannot be set at a high value and Kp cannot be set at a high value. In order to set a large value for Kp, it is necessary to set k to a small value. As a result, when a same speed loop gain as that for a machine of a semi-close control is set, the position loop gain Kp can only be set to ½–⅔ of the set value of a semi-close control.

That is, because the speed feedback value from the linear scale is small, the response by the movable portion is inferior, and, as a result, the position error of the table is only reduced by an amount approximately ½ of that as is the case when semi-close control is applied. When k is set to a suitable value within a range of 0–1 corresponding to characteristics of a machine, the speed of the table which is a control target of a second order inertial system and the speed of the motor which is a control target of a first order inertial system are controlled together. With such a configuration, when a gain Kv is set to the highest value, very small vibrations occurring in the position loop are reflected to the speed instruction and further amplified by the speed loop gain which is set at a high value, resulting in an oscillation of the machine.

In a machine tool, a machine having a same structure may or may not be provided with a linear scale. In other words, even with a single machine, there may be instances in which the machine is controlled in a full-close manner and instances in which the same machine is controlled in a semi-close manner. In the related art of the '550 publication shown in FIG. 6 and the related art of the '607 publication shown in FIG. 7, it is not possible to set the same value for the speed loop in the full-close control and in the semi-close control. Therefore, even with the same machine, the speed loop gains must be set separately for full-close control and semi-close control.

SUMMARY OF THE INVENTION

An advantage of the present invention is that a precision of a position control of a feed shaft is increased. Another advantage of the present invention is that a full-close control is applied using a speed loop gain and position loop gain similar to those in the semi-close control.

According to one aspect of the present invention, there is provided a position controller for controlling a position of a feed shaft of a machine having a motor and the feed shaft driven by the motor, based on an output of a first position detector coupled to the motor and an output of a second position detector coupled to the feed shaft, the position controller comprising a position calculator which outputs a speed feedback instruction obtained from a difference between a position instruction and a position detection value obtained from the output of the second position detector; a position instruction differentiator which differentiates the position instruction to output a speed feedforward instruction; a speed instruction compensator which outputs a speed instruction compensation value obtained from the speed feedforward instruction and an actual speed of the feed shaft obtained from the output of the second position detector; an adder which adds the speed feedforward instruction and the speed feedback instruction to output a motor speed instruction; an integrator which integrates a difference between the motor speed instruction and a motor speed obtained from the output of the first position detector; a proportion calculator which proportionally calculates a difference between a motor speed instruction correction value, in which the motor speed instruction is corrected by adding the speed instruction compensation value, and the motor speed; and an adder which adds an output of the integrator and an output of the proportion calculator to output a torque instruction. The first position detector and the second position detector may be provided within the position controller or on the side of the machine.

According to another aspect of the present invention, it is preferable that, in the position controller, the speed instruction compensator subtracts, from the speed feedforward instruction, the actual speed of the feed shaft obtained from the output of the second position detector and multiplies the resulting subtracted value by a coefficient K which is greater than or equal to 0 and less than or equal to 1 to output the speed instruction compensation value. According to another aspect of the present invention, it is preferable that, in the position controller, the speed instruction compensator includes a coefficient changing device having the coefficient K which can be changed based on a positional difference or on an acceleration derivative instruction obtained by twice differentiating the speed feedforward instruction.

According to another aspect of the present invention, it is preferable that, in the position controller, the speed instruction compensator subtracts, from the speed feedforward instruction, the actual speed of the feed shaft obtained from the output of the second position detector and inputs the resulting subtracted value to a first order delay device to output the speed instruction compensation value. According to another aspect of the present invention, it is preferable that, in the position controller, the speed instruction compensator includes a first order delay device having a time constant which can be changed based on a positional difference or on an acceleration derivative instruction obtained by twice differentiating the speed feedforward instruction.

Because, according to a position controller of the present invention, compensation is included in a speed instruction to a motor such that a speed of a table matches a speed feedforward instruction, it is possible to allow the position of the table to precisely follow the instruction. In addition, vibrations in a movable portion of a machine such as a table is inhibited. A speed loop gain which is similar to that in the semi-close control can be set. Because the motor speed instruction includes compensation, regardless of the setting value of the position loop gain, it is possible to set a gain which is almost equal to that in the semi-close control can be set also for the position loop gain. With this structure, a responsiveness during a transient state is significantly improved. In addition, vibration during a normal operation is inhibited, resulting in an improvement in the processing precision of the machine.

By changing a coefficient of the speed instruction compensator based on a positional difference or an acceleration derivative instruction which is a second derivative of the speed feedforward instruction, it is possible to improve the responsiveness during a transient state. In addition, by changing a time constant of the first order delay circuit based on the positional difference or the acceleration derivative instruction which is a second derivative of the speed feedforward instruction, it is possible to inhibit vibrations during a transient state and in a normal operation.

BRIEF DESCRIPTION OF THE DRAWINGS

A preferred embodiment of the present invention will be described in detail based on the following figures, wherein.

DESCRIPTION OF PREFERRED EMBODIMENT

Figure 1:
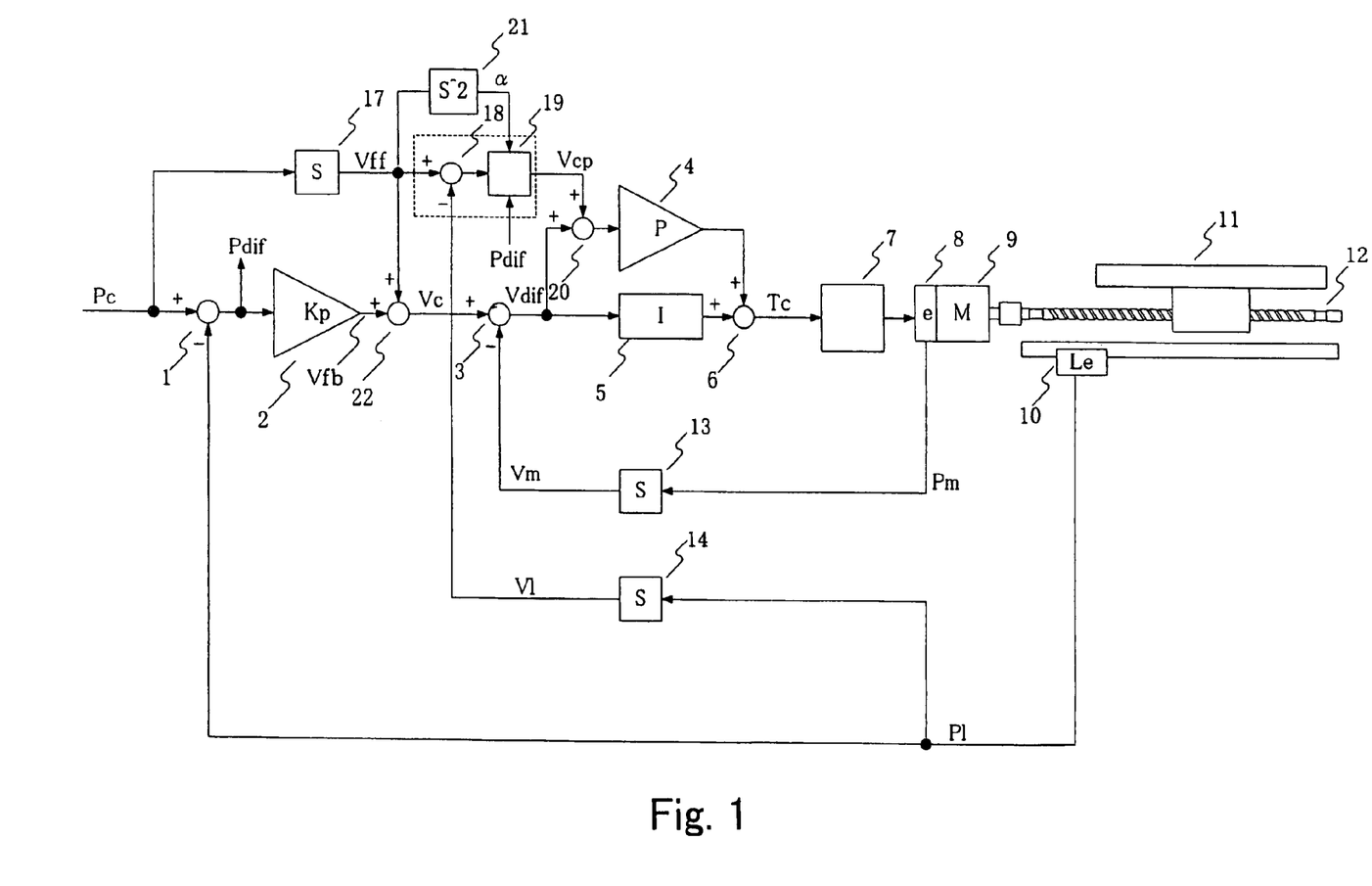
FIG. 1 is a block diagram showing a control according to a preferred embodiment of the present invention.

A preferred embodiment of the present invention will now be described. Elements identical to those in the related art as described above are assigned the same reference numerals and will not be described again. FIG. 1 shows a control block diagram of the embodiment. A differentiator 17 differentiates a position instruction Pc and outputs as a speed feedforward instruction Vff. A subtractor 18 and a calculator 19 as a combination form a speed instruction compensator. The subtractor 18 calculates a difference between a speed detection value Vl of a table detected from a linear scale 10 and the speed feedforward instruction Vff and inputs the difference to the calculator 19. The calculator 19 outputs a speed instruction compensation value Vcp based on the difference.

A subtractor 1 calculates a positional difference between the position instruction Pc and the position detection value Pl detected in the linear scale 10. A calculator 2 calculates a position feedback instruction Vfb by multiplying the positional difference by a position loop gain Kp. An adder 22 adds the position feedback instruction Vfb and the speed feedforward instruction Vff to output a speed instruction Vc. A subtractor 3 calculates a difference between the speed instruction Vc and a speed detection value Vm of the motor to output as a speed difference Vdif. An adder 20 adds the speed difference Vdif and the speed instruction compensation value Vcp. A speed difference proportion calculator 4 calculates a proportional component of the speed difference based on the added result and a proportional gain Pv. A speed difference integration calculator 5, on the other hand, calculates an integral component of the speed difference based on the speed difference Vdif and an integral gain Iv. An adder 6 adds the proportional component of the speed difference and the integral component of the speed difference to output a torque instruction Tc. The torque instruction Tc can be represented by the following equation (5).

$$Tc = [Kp \cdot (Pc - Pl) + SPc - Vm] \cdot (Pv + Iv/S) + \quad \text{(Equation (5))}$$
$$G \cdot (SPc - SPl) \cdot Pv$$
$$= [Kp \cdot (Pc - Pl) + Vff - Vm] \cdot (Pv + Iv/s) +$$
$$G \cdot (Vff - Vl) \cdot Pv$$
$$= (Vc + Vcp - Vm) \cdot Pv + (Vc - Vm) \cdot Iv/S$$

In equation (5), G represents a function represented by the following equation (6) and represents reference numeral 19 in FIG. 1.

$$G=\beta \cdot [1/(1+TS)]=/(1+TS) \quad \text{(Equation (6))}$$

In addition, in equation (5), $$Vc=Kp \cdot (Pc-Pl)+Vff=Vfb+Vff \quad \text{(Equation (7))}$$

and $$Vcp=G \cdot (Vff-Vl) \quad \text{(Equation (8))}$$

Figure 2:
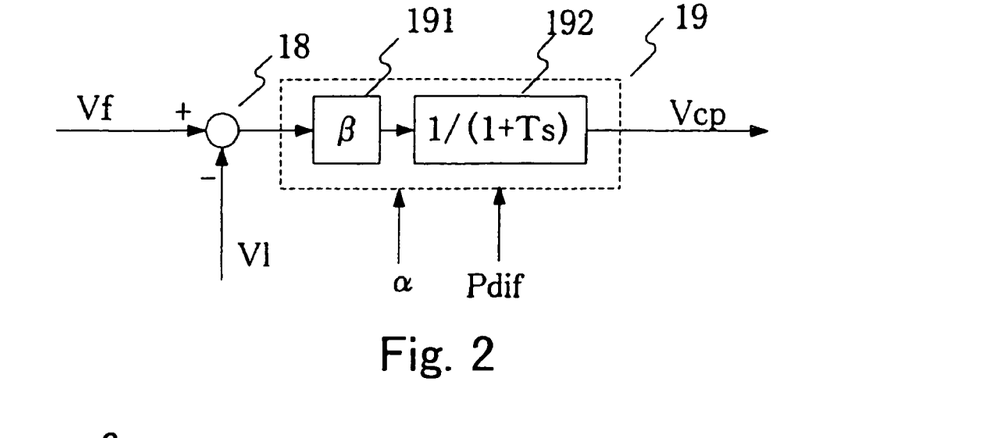
FIG. 2 is a block diagram showing an example configuration of a speed instruction compensator.
Figure 3:
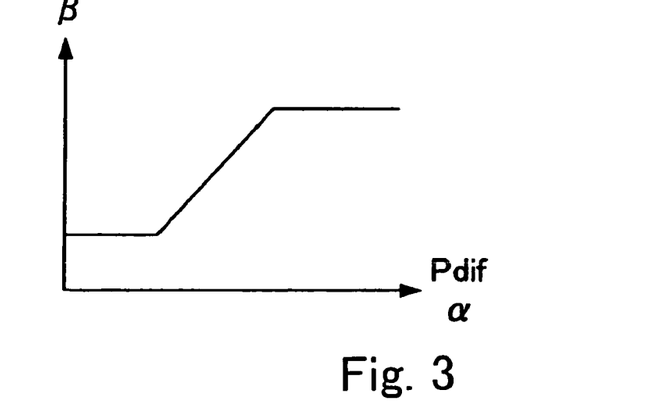
FIG. 3 is a diagram showing an example pattern of a coefficient in the speed instruction compensator.
Figure 4:
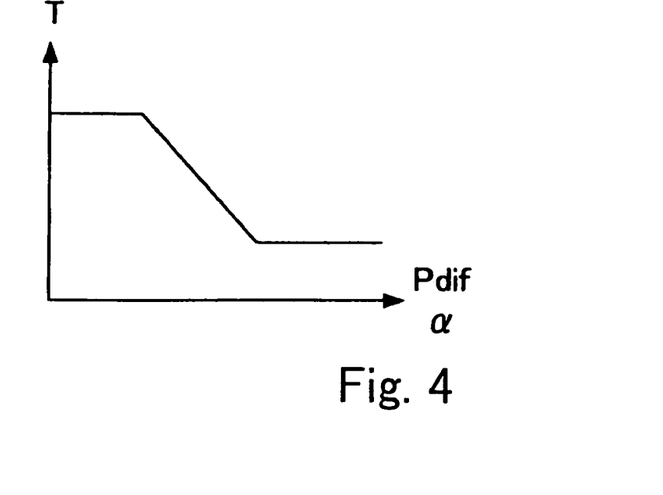
FIG. 4 is a diagram showing an example pattern of a time constant of a first order delay device in the speed instruction compensator.

FIG. 2 shows a detailed block diagram of the calculator 19. In FIG. 2, reference numeral 191 indicates a coefficient. Reference numeral 192 is a first order delay circuit which may include, for example, a low pass filter. A differentiator 21 in FIG. 1 twice differentiates the speed feedforward instruction Vff and outputs an acceleration derivative instruction $\alpha$. A coefficient $\beta$ in FIG. 2 can be set to an arbitrary fixed value in a range of $0 \leq \beta \leq k$ or may be a variable value which is given by the positional difference Pdif or the acceleration derivative instruction a output from the differentiator 21 in FIG. 1. When variable, the value of $\beta$ becomes small when the positional difference Pdif or acceleration derivative instruction a is small and the value of $\beta$ becomes large when the positional difference Pdif of the acceleration derivative instruction $\alpha$ is large. FIG. 3 shows a form of a variable pattern of the coefficient $\beta$. A time constant T forming the first order delay circuit of reference numeral 192 in FIG. 2 may be set to an arbitrary constant value, or may be a variable value given by the positional difference Pdif or the acceleration derivative instruction a output from the differentiator 21 in FIG. 1. When variable, the time constant T becomes large when the position difference Pdif or the acceleration derivative instruction $\alpha$ is small, and the time constant T becomes small when the positional difference Pdif or the acceleration derivative instruction a is large. FIG. 4 shows a form of a variable pattern of the time constant.

Figure 10:
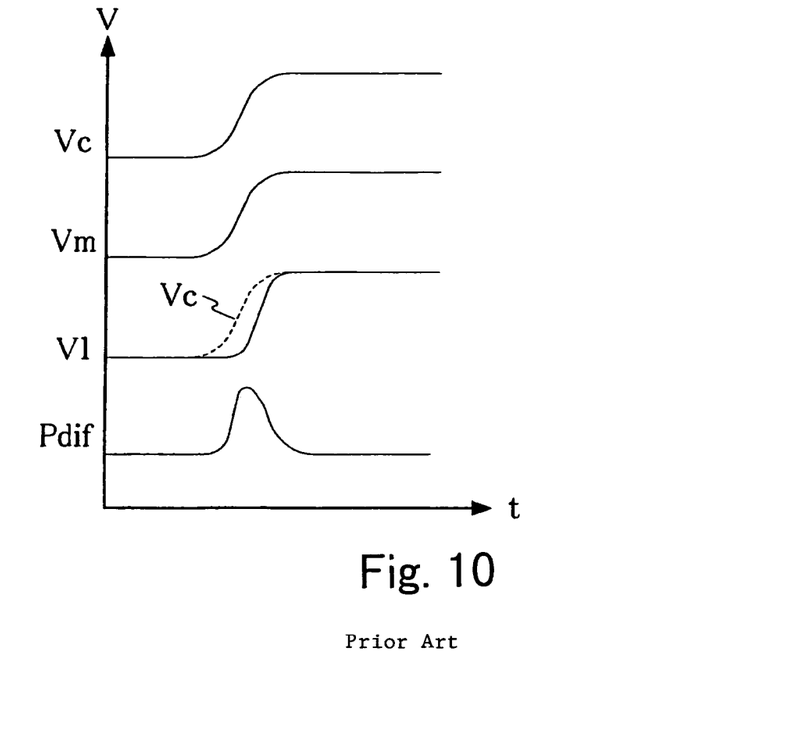
FIG. 10 is a diagram showing a speed detection value and a positional difference waveform in the related art.

As described with reference to the related art, regarding the speed loop, a high speed loop gain can now be set with various filtering techniques, vibration suppression control, and increase in the speed of the speed loop. Because of this, as shown in FIG. 10, the speed detection value Vm of the motor precisely follows the speed instruction Vc and there is now almost no speed difference. However, in a transient state, the speed of the table does not follow as much as the motor speed does due to a lost motion including a loose ball screw, and a speed difference occurs as shown in Vl in FIG. 10. The speed instruction compensation value Vcp output from the calculator 19 of FIG. 1 is calculated from a difference between the speed feedforward instruction Vff and a speed Vl of the table as shown in equations (5) and (8) and is added to the speed instruction Vc. Thus, a compensation corresponding to the speed difference of the table is performed without being affected by the position loop gain. Because the speed loop can allow the motor speed to precisely follow the compensated speed instruction Vc+Vcp, the speed difference of the table is reduced. In addition, because the speed loop can apply compensation corresponding to the speed difference of the table without being affected by the position loop gain, not only in a transient response, but also in the normal state, the speed difference of the table is reduced. In addition, the speed instruction compensation value Vcp, which is the output of the calculator 19, only acts on the proportional component in the speed loop, and, thus, there is no possibility of a stationary difference or the like.

In the embodiment of the present invention, unlike in the related art, the speed Vl of the table is not used as the feedback value of the speed loop. That is, regarding the speed loop, because only the speed detection value Vm of the motor is feedback, similar to the block diagram of FIG. 8, it is possible to set a speed loop gain similar to that in the semi-close control.

Figure 5:
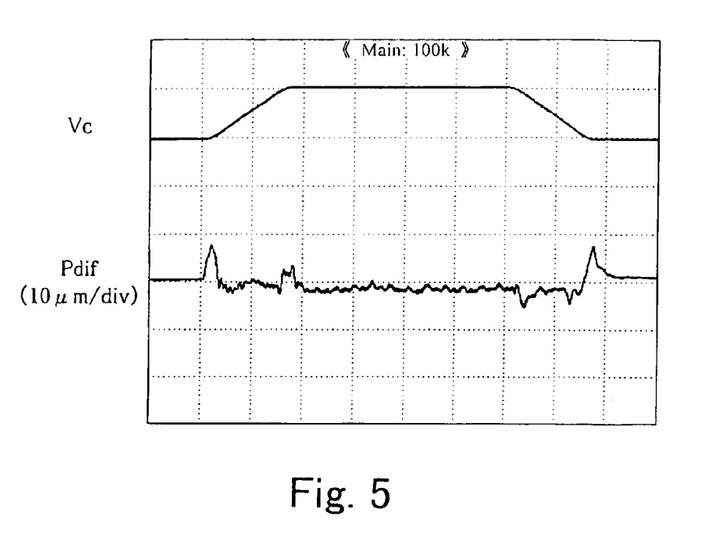
FIG. 5 is a diagram showing an example of a speed and positional difference waveforms when the present invention is applied to a machine.
Figure 11:
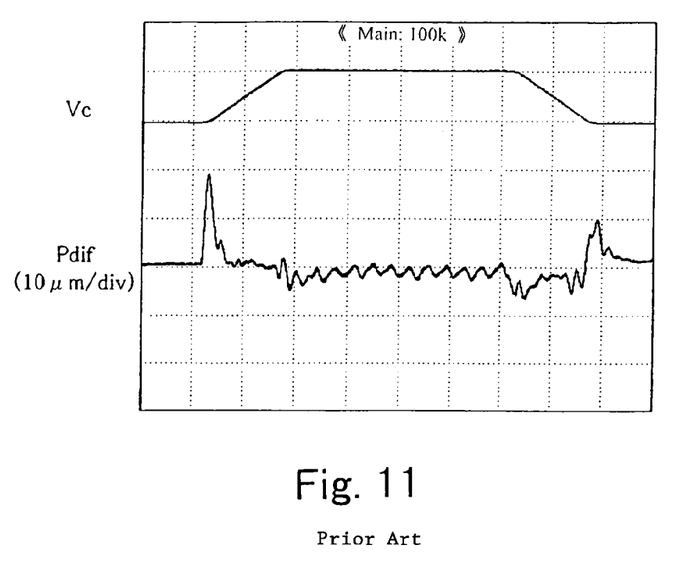
FIG. 11 is a diagram showing speed and positional difference waveforms when the related art is applied to a machine.

FIG. 5 shows waveforms of a speed and a positional difference when the embodiment is applied to a control of a feed shaft in a large machining center. FIG. 11 shows waveforms of a speed and a positional difference when a related art of FIG. 7 is applied to a control of a feedshaft in a large machining center. In the waveforms shown in FIG. 5, a positional difference Pdif at an early stage of acceleration is half that shown in FIG. 11. In addition, an amplitude of vibration of the positional difference Pdif during a movement of a constant speed is halved and it can be seen that a periodic vibration phenomenon itself of the waveform is improved.

What is claimed is:

1. A position controller for controlling a position of a feed shaft of a machine having a motor and the feed shaft driven by the motor, based on an output of a first position detector coupled to the motor and an output of a second position detector coupled to the feed shaft, the position controller comprising:
    a position calculator which outputs a speed feedback instruction obtained from a difference between a position instruction and a position detection value obtained from the output of the second position detector;
    a position instruction differentiator which differentiates the position instruction to output a speed feedforward instruction;
    a speed instruction compensator which outputs a speed instruction compensation value obtained from the speed feedforward instruction and an actual speed of the feed shaft obtained from the output of the second position detector;
    an adder which adds the speed feedforward instruction and the speed feedback instruction to output a motor speed instruction;
    an integrator which integrates a difference between the motor speed instruction and a motor speed obtained from the output of the first position detector;
    a proportion calculator which proportionally calculates a difference between a motor speed instruction correction value, in which the motor speed instruction is corrected by adding the speed instruction compensation value, and the motor speed; and
    an adder which adds an output of the integrator and an output of the proportion calculator to output a torque instruction.

2. A position controller according to claim 1, wherein the speed instruction compensator subtracts, from the speed feedforward instruction, the actual speed of the feed shaft obtained from the output of the second position detector and multiplies the resulting subtracted value by a coefficient K which is greater than or equal to 0 and less than or equal to 1 to output the speed instruction compensation value.

3. A position controller according to claim 2, wherein
    the speed instruction compensator comprises a coefficient changing device having the coefficient K which can be changed based on a positional difference or on an acceleration derivative instruction obtained by twice differentiating the speed feedforward instruction.

4. A position controller of a feed shaft according to claim 1, wherein
    the speed instruction compensator subtracts, from the speed feedforward instruction, the actual speed of the feed shaft obtained from the output of the second position detector and inputs the resulting subtracted value to a first order delay device to output the speed instruction compensation value.

5. A position controller of a feed shaft according to claim 4, wherein
    the speed instruction compensator comprises a first order delay device having a time constant which can be changed based on a positional difference or on an acceleration derivative instruction obtained by twice differentiating the speed feedforward instruction.

* * * * *